Patented June 10, 1941

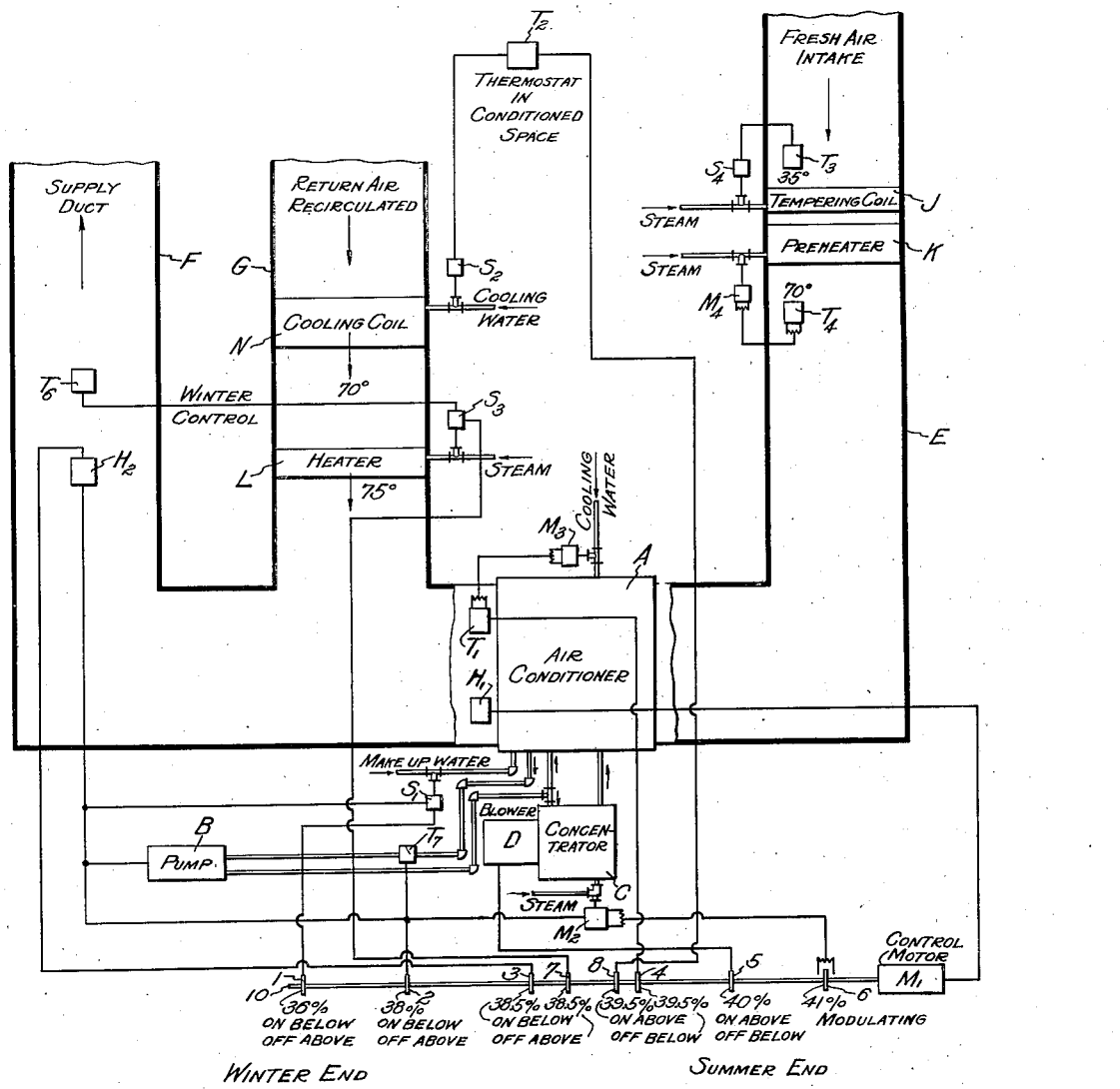

2,245,464

UNITED STATES PATENT OFFICE 2,245,464

CONTROL OF AIR CONDITION

Stewart C. Coey, Glen Ridge, N. J., assignor to Research Corporation, New York, N. Y., a corporation of New York Application January 21, 1937, Serial No. 121,663

12 Claims. (Cl. 236—44)

This invention relates to a method and apparatus for the automatic regulation of the condition of air supplied to enclosed spaces, and is particularly directed to the control of air conditioning systems of the type in which the humidity of the air is regulated by means of a moisture absorbing or releasing agent, such as calcium chloride brine, sulfuric acid solutions and the like. The control method and apparatus of the present invention are particularly adapted to the regulation of the type of air conditioning systems described in my Patent No. 2,162,158, dated June 13, 1939.

A principal object of the invention is the provision of means whereby an air conditioning system may be automatically regulated to provide air of a predetermined comfort range of temperature and relative humidity in every season of the year.

A further object of the invention is the provision of means for automatically adapting the operation of an air conditioning system to summer and winter conditions.

A characteristic feature of the invention is that the operation of the air conditioning device is controlled by the relative humidity of the air leaving the device. More particularly the operation of the conditioning device in supplying or removing latent and sensible heat to or from the air passing to the conditioned space is controlled, by the present invention, by the variation of the relative humidity of the air leaving the device from a predetermined equilibrium point.

When the moisture content of air is controlled by contacting the air with an extended surface of an equeous solution of a hygroscopic agent, such as a calcium chloride brine, the vapor pressure of the moisture content of the air is in equilibrium with the vapor pressure of the solution at a substantially constant relative humidity over a wide range of temperature. For example, when the concentration of a calcium chloride solution is maintained at 38% ±1%, the relative humidity of the air in contact with the brine will be 43% ±2% over a range of temperature of 40° F. to 100 F. By passing the air to be conditioned in contact with an extended surface of calcium chloride brine maintained at a predetermined concentration by the addition of water thereto, or the removal of water therefrom, the air will be brought to a constant relative humidity over a wide temperature range, if the extent of contact surface is sufficiently great to insure the attainment of substantial equilibrium between the vapor pressure of moisture in the air and in the solution. Moreover, if the temperature of the solution is also maintained at a predetermined point, both the relative humidity and the dry bulb temperature of the air leaving the solution will be brought to the desired levels.

The concentration of the solution may be maintained by directly adding water thereto and by removing water therefrom, for example, by evaporation. The temperature of the solution may be maintained by contacting the solution with a cooling or heating medium, as may be required. It will be seen that the hygroscopic solution may thus be used as a medium for the transfer of both sensible and latent heat to and from the air. The cooling of the solution is advantageously effected, at least in part, concurrently with the conditioning of the air, by passing the air over pipes or coils provided with fins, the hygroscopic solution being flowed or sprayed over the exterior of the coils and a cooling medium being circulated through the interior of the coils, as described more fully in my application referred to above.

In the invention the supply of heat and water to, and the removal of heat and water from, the hygroscopic solution is regulated in accordance with variations of the relative humidity of the air leaving the conditioning device, so that the latent and specific heat contents of the air may be maintained at predetermined desired points within a very narrow range. This is advantageously effected by bringing into operation in suitable sequence a plurality of control elements by means of a master controller actuated by a humidity-responsive device exposed to the air leaving the conditioning device.

An illustrative embodiment of the principles of the invention will be more particularly described with reference to the accompanying drawing which is a diagrammatic representation of a control system including characteristic features of the invention.

In the drawing, A is an air conditioning device, typically containing finned coils over the outside of which a hygroscopic liquid, such as calcium chloride brine, while a cooling medium, such as water, may be circulated through the interior of the coils. Connected to the conditioner A by conduits including a circulating pump B is a concentrator C provided with heating coils which may be supplied with a heating medium such as steam, and also provided with a blower D by means of which moisture evaporated from the hygroscopic solution may be removed from the concentrator.

The movement of a step control motor $M_1$ is controlled by humidostat $H_1$, which is positioned in the air leaving conditioner A. Through member 10 the motor $M_1$ actuates switch members 1 to 8, at selected positions of the motor corresponding to predetermined relative humidity levels affecting humidostat $H_1$. The set of relative humidity control points indicated on the drawing is given merely by way of example. The various switch members control the operation of devices for supplying water, heat and cooling medium, or of secondary control devices, as will be described in detail in describing the operation of the control system shown in the drawing.

Fresh air enters the conditioning system through intake conduit E, while conditioned air passes to the conditioned space through conduit F. Air may be withdrawn from the conditioned space, when desired, through conduit G, and after being tempered by cooling or heating devices, returned through conduit F.

The operation of the system will be described as it responds to the effect of outside weather conditions throughout the year beginning with winter conditions at 0° F. and a correspondingly low moisture content in the atmosphere. Air at 0° F. enters intake E. Tempering coil J controlled by thermostat $T_3$ and motor or solenoid $S_4$ brings the air to above 35° F. and preheater K, controlled by thermostat $T_4$ and modulating motor $M_4$ raises it to 70° F.

In the conditioner A, moisture is taken up from the hygroscopic liquid, which is, for example, a calcium chloride brine at a concentration of calcium chloride in equilibrium with air of 36% relative humidity. As the solution gives up more water to the air becoming more concentrated, the relative humidity of the air leaving the conditioner will drop below 36%. At this point switch element 1 is brought into operative position and actuates control motor or solenoid $S_1$ to admit water, either as liquid or as steam, to the hygroscopic solution, the direct addition of steam keeping the solution at approximately a constant temperature. Steam can be supplied to heat the solution indirectly when water is added in the liquid form. A thermostat $T_7$ is located in the solution and shuts off the steam supply to the concentrator when this solution has reached a predetermined temperature. Under winter conditions the steam valve motor $M_2$ is controlled by switch element 2 which is positioned to be on below 38% relative humidity and off above 38% relative humidity.

The possibility that during the coldest weather it may be desirable to reduce the relative humidity in the conditioned space below 38.5% in order to prevent condensation on the windows is provided for by a secondary control humidostat $H_2$, positioned in the supply duct, which can be set to operate at any desired relative humidity below 38.5% and cuts out of operation pump B, steam supply $M_2$ and make-up water supply $S_1$, whenever the relative humidity in supply duct F goes above the predetermined point. When the relative humidity of the air leaving the conditioner is above 38.5%, humidostat $H_2$ is kept out of operation by switch element 3 so that it can no longer control the above-mentioned devices.

When the air leaving the conditioner is above 39.5% relative humidity, switch element 4 brings into operation modulating thermostat $T_1$ which controls the supply of cooling water through modulating motor $M_3$ to maintain the air at a predetermined temperature, for example, 70° F. Below 39.5% relative humidity the valve operated by motor $M_3$ has been closed and thermostat $T_1$ has not been in operative effect.

As the air leaving the conditioner reaches 40%, dehumidification is required and switch element 5 brings concentrator blower D into operation. At a relative humidity of 41%, modulating switch element 6 comes into operation and modulates the steam supply to concentrator C by means of modulating motor $M_2$.

The tempering of the return air in conduit G may be controlled by switch elements 7 and 8. Element 7 brings into operation thermostat $T_5$ controlling steam supply valve $S_3$ to heater L, at relative humidities below 38.5%, and element 8 brings into operation thermostat $T_2$ controlling cooling water supply valve $S_2$ to cooling coil N at relative humidities above 39.5%.

The operation of the system, when adjusted to supply air at about 70° F. dry bulb temperature, 56° F. wet bulb temperature and a dew point of 45° F. corresponding to a relative humidity of 40% may be summarized as follows:

At any time that the wet bulb temperature of the entering air is more than 56° F. the conditioner will absorb moisture from the air and the relative humidity of the air leaving the conditioner will be above 40%. This represents summer conditions and the automatic control device will bring into operation at predetermined relative humidity levels, which need not all be different:

(a) Summer control thermostat, $T_2$.
(b) Cooling water modulating control, $M_3$.
(c) Concentrator blower, D.
(d) Concentrator steam supply, $M_2$.

Whenever the outside wet bulb temperature is less than 56° F. the conditioner will be supplying moisture to the air and the relative humidity of the air leaving the conditioner will be below the equilibrium point of 38.5%. This represents winter conditions and the automatic control device will bring into operation at predetermined relative humidity levels:

($a^1$) Winter control thermostat, $T_6$.
($b^1$) Secondary control humidostat, $H_2$.
($c^1$) Concentrator steam supply, $M_2$ and thermostat $T_7$.
($d^1$) Make-up water supply, $S_1$.

At an outside wet bulb temperature of 56° F., the air passing through the conditioner will neither pick up nor lose water from the hygroscopic liquid and $a$, $b$, $c$, $d$, $a^1$, $b^1$, $c^1$, and $d^1$ are all off.

It will be seen that the control system automatically shifts from summer operating conditions to a neutral or balanced condition and then to winter operating conditions as the outside wet bulb temperature drops through 56° F. or other predetermined level.

It will also be seen that a wide variety of arrangement of control devices and secondary control elements may be provided without departing from the principles of the invention as described above and defined in the claims, the invention broadly comprising the control of the operation of air conditioning apparatus by the effect upon a humidity sensitive element of the air leaving moisture regulating means of such apparatus.

I claim:

1. Apparatus for controlling the operation of air conditioning apparatus in which the air is contacted with a hygroscopic liquid comprising devices controlling the supply of heat and of water to said hygroscopic liquid for adjusting the aqueous vapor pressure of the hygroscopic liquid, a motor device, a humidity-sensitive device positioned for contact with the air leaving the hygroscopic liquid and controlling the movement of the motor device, and means for bringing said devices controlling the supply of heat and of water into and out of operation at predetermined positions of said motor device.

2. In a system for controlling the operation of air conditioning apparatus in which air is contacted with a hygroscopic liquid, a humidity-sensitive element in contact with air leaving the hygroscopic liquid and means responsive to said humidity-sensitive element for bringing into and out of operation means for supplying heat and water to said hygroscopic liquid for adjusting the aqueous vapor pressure thereof.

3. In a system for controlling the operation of air conditioning apparatus in which air is contacted with a hygroscopic liquid, a humidity-sensitive element in contact with air leaving the hygroscopic liquid, and means responsive to said humidity-sensitive element for bringing into operation means for supplying heat to the air and water to the hygroscopic liquid at relative humidities of the air below a predetermined point and for bringing into operation means for removing heat from the air and water from the hygroscopic liquid at relative humidities of the air above a predetermined point.

4. A method of controlling the operation of air conditioning apparatus in which the air is contacted with a hygroscopic liquid which comprises removing heat and water from the hygroscopic liquid when the air leaving the apparatus has a relative humidity above a predetermined point and supplying heat and water to the hygroscopic liquid when the air leaving the apparatus has a relative humidity below a predetermined point.

5. In a system for controlling the operation of air conditioning apparatus in which air is contacted with a hygroscopic liquid, a humidity-sensitive element in contact with air leaving the hygroscopic liquid, means responsive to said humidity-sensitive element for bringing into operation means for supplying heat to the air and water to the hygroscopic liquid at relative humidities of the air below a predetermined point and for bringing into operation means for removing heat from the air and water from the hygroscopic liquid at relative humidities of the air above a predetermined point, a second humidity-sensitive element in contact with air supplied to a space to be conditioned, and means responsive to said second humidity-sensitive element for preventing the operation of said means for supplying water to the hygroscopic liquid at relative humidities of the air supplied to the space to be conditioned above a predetermined point.

6. In a system for controlling the operation of air conditioning apparatus in which air is contacted with a hygroscopic liquid, a humidity-sensitive element in contact with air leaving the hygroscopic liquid and means responsive to said humidity-sensitive element for bringing into and out of operation means for supplying heat and water to the hygroscopic liquid.

7. In a system for controlling the operation of air conditioning apparatus in which air is contacted with a hygroscopic liquid, means for sensing the relative humidity of the air immediately after it has contacted the hygroscopic liquid, concentrating means for removing absorbed water from said hygroscopic liquid, correlated selective devices for independently controlling the supply of air and the supply of heat to said concentrating means, and means responsive to said sensing device for operating said selective devices.

8. In a system for controlling the operation of air conditioning apparatus in which air is contacted with a hygroscopic liquid, a humidity-sensitive element in contact with air leaving the hygroscopic liquid, means responsive to said humidity-sensitive element for bringing into operation means for supplying heat to the air and water to the hygroscopic liquid at relative humidities below a predetermined point, means for adding recirculated air from the conditioned space to the conditioned air leaving the hygroscopic liquid, means positioned in the combined air stream for sensing the modifying effect of recirculated air on the conditioned air arranged to shut off the flow of hygroscopic liquid when the relative humidity of the combined stream of conditioned and recirculated air reaches a predetermined point and means responsive to said humidity-sensitive element for bringing into operation means for removing heat from the air and water from the hygroscopic liquid at relative humidities of the air above a predetermined point.

9. A method of controlling the operation of air conditioning apparatus in which air is contacted with a hygroscopic liquid which comprises supplying heat to said liquid to remove moisture therefrom when the relative humidity of air which has been contacted with the liquid is above a predetermined point, and supplying water to said liquid when the relative humidity of air which has been contacted with the liquid is below a predetermined point.

10. In a system for controlling the operation of air conditioning apparatus in which air is contacted with a hygroscopic liquid, a humidity-sensitive element in contact with air leaving the hygroscopic liquid, and means responsive to said humidity-sensitive element for supplying heat to said liquid to remove moisture therefrom when moisture is being removed from the air being conditioned and for supplying water to said liquid when moisture is being added to the air being conditioned.

11. In a system for controlling the operation of air conditioning apparatus in which air is contacted with a hygroscopic liquid, a humidity-sensitive element in contact with air leaving the hygroscopic liquid, a motor device responsive to said humidity-sensitive element and means actuated by said motor device for supplying heat to said liquid to remove moisture therefrom when the motor device is in a position corresponding to a relative humidity above a predetermined point and for supplying water to said liquid when the motor device is in a position corresponding to a relative humidity below a predetermined point.

12. A method of controlling the operation of air conditioning apparatus in which the air is contacted with a hygroscopic liquid which comprises controlling the supply of heat and water to the air through the medium of the hygroscopic liquid by adjusting the vapor pressure of the hygroscopic liquid in relation to the relative humidity of the air leaving the contact with the hygroscopic liquid before its relative humidity has been substantially altered after leaving said contact.

STEWART C. COEY.